Aug. 8, 1967  H. W. HALLESY  3,334,510
EXPLOSIVELY ACTUATED TOOL
Filed July 22, 1964  2 Sheets-Sheet 1

INVENTOR.
HAROLD W. HALLESY
BY
Erwin F. Adams
ATTORNEY

INVENTOR.
HAROLD W. HALLESY
ATTORNEY

United States Patent Office 3,334,510
Patented Aug. 8, 1967

3,334,510
EXPLOSIVELY ACTUATED TOOL
Harold W. Hallesy, Yakima, Wash., assignor to The Boeing Company, Seattle, Wash., a corporation of Delaware
Filed July 22, 1964, Ser. No. 384,301
5 Claims. (Cl. 72—407)

This invention relates to explosively actuated tools and more particularly to explosively actuated tools for providing a clamping force.

This invention was developed to facilitate the connection of tubes or pipes by providing a tool which joins tubes or pipe to a fitting. One of the most permanent types of tube connections which provides a reliable, easily installable and light weight joint is a swaged tube fitting. A particular swaged fitting which is useful to join high strength tube materials while maintaining the critical internal profile necessary for externally swaged joints is an H fitting assembly comprising a basic fitting, such as a union, elbow, T, etc., and slides for each end of the fitting. The external contour of the fitting has a circumferential taper extending towards the ends and the slides have a matching taper which when forced over the fitting towards the center exert a high radial force on the fitting and the tubes to be joined. However, tools for assembling this fitting have been heavy, cumbersome and awkward during the assembly installation.

Accordingly, it is an object of the present invention to provide a tool which is lightweight, compact and has a self-contained high energy source for providing the clamping operation.

It is another object of the present invention to provide a tool for producing a clamping force which utilizes the gas forces produced by the firing of an explosive charge.

It is still another object of the present invention to provide a tool which includes means for supporting and positioning the tubes and fitting assembly during the connecting operation.

It is yet another object of the present invention to provide a tool having working elements which may be easily interchanged for accepting various sizes of tubes and fittings and various shapes of fittings, such as T's, crosses, elbows and adapters.

Briefly stated, in accord with one embodiment of the invention, there is provided a tool comprising a body having a piston bore therein, a pair of oppositely disposed pistons slideably mounted in the bore, each piston having a working element supported thereon, these elements include means for supporting and positioning the material upon which work is to be performed and means for exploding a charge of material so as to axially force the pistons and working elements toward one another.

The novel features believed characteristic of the invention are set forth in the appended claims. The invention itself, together with further objects and advantages thereof, may best be understood with reference to the following description, taken in conjunction with the attached drawings in which:

Figure 1:
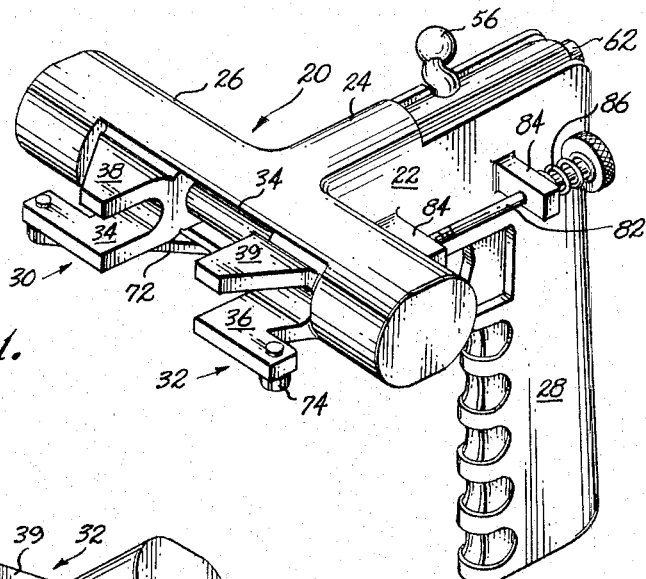
FIGURE 1 is a perspective view of a preferred form of tool in accordance with the present invention.
Figure 2:
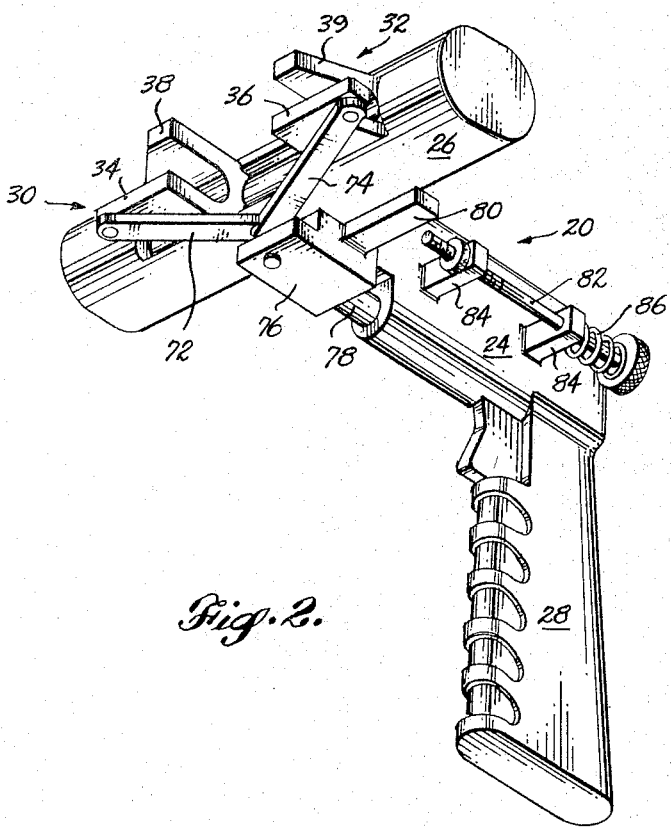
FIGURE 2 is a perspective view of the tool shown in FIGURE 1.

Referring now to FIGURES 1 and 2, there is shown a tool 20 having a body 22. The body 22 has a first portion 24 and a second portion 26 disposed transversely to the first portion 24. A pistol-type handle 28 is provided for ease of use of the tool during an assembly operation. A pair of working elements 30 and 32 extend from a longitudinally extending slot 34 in transverse body portion 26.

The working elements or die-heads 30 and 32 have supporting elements 34 and 36, respectively, for supporting the tubes to be joined. Also, the elements 30 and 32 have clamping arms 38 and 39, respectively, adapted to engage the slides on the tube fitting assembly.

Figure 3:
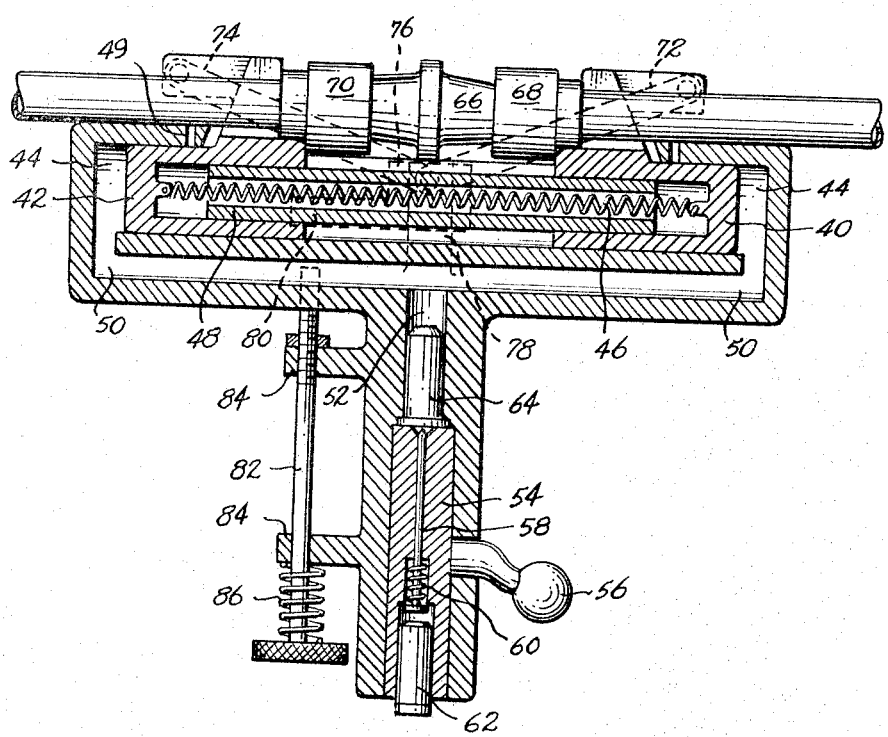
FIGURE 3 is a plan sectional view of the tool shown in FIGURE 1.

The working elements 30 and 32 are supported by pistons 40 and 42, as shown in FIGURE 3, or may be integral therewith. The pistons 40 and 42 are slideably mounted in a bore or cylinder 44 disposed in the transverse body portion 26. Between the pistons 40 and 42 is mounted resilient means in the form of a tension spring 46. The spring 46 is connected at its opposite ends to the inner surface of the pistons 40 and 42. Around the spring 46 is positioned a piston stop or limiting means in the form of a cylinder 48. The opposite ends of the bore 44 are connected through passages 50 to a breech 52. Vents or ports 49 are properly positioned in bore 44 to relieve any overpressure existing in the cylinder when the pistons have moved their full distance. The breech 52 constitutes a portion of the means for exploding a charge of material which comprises a bolt 54 slideably mounted in the breech 52. The bolt 54 includes a bolt-action handle 56 and has slideably mounted therein a firing pin 58. The firing pin 58 is resiliently mounted by spring 60 and adapted to be advanced forward by a hammer 62 which is pivotally mounted on the body 22. The shape of breech 52 is adapted so that an explosive cartridge 64 may be positioned by bolt 54 into the forward portion of breech 52 in a firing position.

As shown in FIGURE 3, tubes are positioned in the working elements 30 and 32 and extend into a fitting assembly 66. The fitting assembly 66 has an inward taper towards its end and slides 68 and 70 are adapted to coact therewith. A pair of links 72 and 74 are pivotally mounted at one end to the working elements 30 and 32, respectively. The other end of each of the links 72 and 74 are pivotally connected to an equalizing slide 76. The equalizing slide 76, in turn, is slideably mounted on a slide rod 78 which is positioned transverse to the axis of bore 44. Extending laterally from the equalizing slide 76 is an arm 80 which comprises a portion of the working element reset means. The reset means also includes a manually operated reset push rod 82 slideably mounted in lugs 84 extending from the body 22. The reset rod 82 is resiliently mounted by spring 86 so as to be normally in the inoperative position.

In operation, the tubes are inserted into the fitting assembly 66 having the slides 68 and 70 thereon and positioned in the working elements 30 and 32 of the tool 20. Positioning is facilitated by the spring 46 which biases the working elements against the slides and additionally removes any slack between the slides and clamping arms 38 and 39. An explosive cartridge or charge 64 is fitted into breech 52 by disengaging bolt 54 with handle 56 so that the shell may be positioned. The bolt 54 is then moved forward in a normal rifle bolt-action manner so that the cartridge 64 is ready for firing. The operator then pulls the trigger 88 which explodes the cartridge 64 producing a high pressure gas in the breech 52 which moves through the passages 50 into the bore 44. The gas pressure in bore 44 will be substantially equal at both ends and will force pistons 40 and 42 in a direction towards one another with equal force. This force moves working elements 30 and 32 together which forces the slides 68 and 70 on fitting assembly 66 to overcome the sliding friction produced by the taper of fitting 66 and thereby apply a high radial force to the fitting 66 against the ends of the tubes. The links 72 and 74 in combination with the equalizing slide 76 assures that the force exerted on the slides 68 and 70 are equal so that the tubes and fitting are not displaced within the tool. Of course, this is an ancillary means for assuring equal force on the slides since the gas pressure on the pistons 40 and 42 should be equal. The limiting means 48 is provided to prevent the pistons from moving too close together thereby causing undue pressure of slides 68 and 70 on the fitting 66. The high pressure gases in bore 44 are vented to atmosphere through gas vents 49 when the pistons 40 and 42 have moved their limiting distance towards one another. The limiting means and relief ports will prevent any over-swaging of the fittings.

The tool 20 has also been provided with a means for returning the working elements 30 and 32 to their normal inoperative position so as to facilitate the reloading of the tool. As may best be seen in FIGURE 3, when the elements 30 and 32 are in close proximity the links 72 and 74 have forced the equalizing slide 76 towards the handle of the tool. The arm 80 on equalizing slide 76 has also moved towards the handle of the tool which brings it in close proximity to the forward end of reset rod 82. The operator, in order to force the elements 30 and 32 apart, may push on the end of reset rod 82 overcoming the bias of spring 86 so that the forward end of the rod pushes on arm 80 forcing the equalizing slide 76 to move the ends of the links 72 and 74 apart. The tool is then ready to be reloaded with another fitting assembly and tubes to be joined thereby.

It will therefore be seen that the present invention provides a tool which is easy to handle, requires no external power source, such as hydraulic or air pressure, and yet provides a high clamping force which is useful in a swaging operation such as the one above described. Moreover, the particular working elements shown in the preferred embodiment useful in a swage-type fitting assembly provide a force which is coaxial with the axis of the tubes to be joined and thereby prevents a bending strain from being introduced into the fitting and the tubes.

While a particular embodiment of the present invention has been shown and described, it will be obvious to those skilled in the art that changes and modifications may be made without departing from the invention in its broader aspect. Accordingly, the aim in the appended claims is to cover all such changes and modifications as fall within the true spirit and scope of the invention.

I claim:
1. A tool comprising:
   (a) a body having a piston bore therein;
   (b) a pair of oppositely disposed pistons slideably mounted in said bore, each piston having a working element supported thereon, said elements including means for supporting and positioning the material upon which work is to be performed;
   (c) means for exploding a charge of material so as to axially force said pistons together;
   (d) a pair of links, each link having one end pivotally supported by one of said working elements and the other end pivotally supported by an equalizing slide;
   (e) said equalizing slide adapted to be slideably mounted on a slide mount positioned transverse to the axis of said piston bore.

2. The tool of claim 1 wherein said means for exploding a charge of material comprises:
   (a) a portion of said body having a breech disposed therein;
   (b) a bolt slideably engaging said breech;
   (c) a firing pin resiliently slideably mounted in said bolt; and
   (d) a hammer mounted on said body for advancing said firing pin to explode a charge of material.

3. The tool of claim 2 additionally comprising tension means for resiliently biasing said pistons toward one another.

4. The tool of claim 3 additionally comprising stop means for limiting the distance said pistons may travel.

5. The tool of claim 4 additionally comprising working element reset means for returning said elements to their normal position when said elements have been forced together by the explosion of a charge.

References Cited

UNITED STATES PATENTS 2,149,641   3/1939   Temple _____ 29—421

CHARLES W. LANHAM, *Primary Examiner.*

R. D. GREFE, *Assistant Examiner.*